March 22, 1960 B. REES 2,929,165
WATER-FOWL DECOY APPARATUS OR THE LIKE
Filed Dec. 5, 1957 2 Sheets-Sheet 1

INVENTOR
BYRON REES
BY M. Ralph Shaffer
HIS ATTORNEY

March 22, 1960 B. REES 2,929,165
WATER-FOWL DECOY APPARATUS OR THE LIKE
Filed Dec. 5, 1957 2 Sheets-Sheet 2

INVENTOR
BYRON REES
BY M. Ralph Shaffer
HIS ATTORNEY

United States Patent Office 2,929,165
Patented Mar. 22, 1960

2,929,165

WATER-FOWL DECOY APPARATUS OR THE LIKE

Byron Rees, Salt Lake City, Utah

Application December 5, 1957, Serial No. 700,806

5 Claims. (Cl. 43—3)

This invention relates to water-fowl decoys and, more particularly, to new and improved water-fowl decoy apparatus which facilitates easy handling of decoys, admits of decoy self-deflation, and which is highly portable.

In the past there have been devised numerous types of water-fowl decoys. Familiar to duck and geese hunters are the cork decoy, the "shadow" type decoy comprised of a flat, metallic silhouette and a rod affixed thereto for insertion into the mud of a like shoal area, the conventional inflatable decoy, and so forth.

All of these types of decoys appear to have certain inherent disadvantages. For example, cork decoys are bulky and cumbersome to carry in any reasonable quantity. "Shadow" decoys do have the advantage of being capable of emplacement in fixed position, by virtue of the rod inclusion in the design thereof, and therefore are incapable of drifting away from their emplacement despite the turbulence or drift of the water; however, the silhouettes lack a true, realistic appearance and, additionally, are apt to become bent or otherwise disfigured during transportation. A conventional inflatable decoy generally includes an air tube the nipple of which is tucked into a ring or pocket, or is simply closed shut by wrapping a string or rubber band around the tube end so as to retain air in the decoy interior. While it is true that inflatable rubber decoys of conventional type have the advantage of being compressed for transport and storage, it is nonetheless inconvenient for the hunter to release the air inside the decoys when retrieving them from their water emplacement, since the decoys will be cold, wet, perhaps muddy, because of which the hunter may incur difficulty and discomfort in releasing or removing the means, whatever it may be, which secures the air tube in closed condition.

Therefore, it is an object of the present invention to provided new and improved water-fowl decoy apparatus.

It is the further object of the present invention to provide new and improved water-fowl decoy apparatus in which the decoy is self-deflating.

It is an additional object of the present invention to provide new and improved water-fowl decoy apparatus which is highly portable, may accommodate the transport of as many as twenty, thirty, or perhaps forty decoys, and is convenient for storage purposes.

According to the present invention, decoy apparatus includes an inflatable, deflatable decoy composed of pliable, compressible material such as rubber. The air tube accommodating the same is disposed on the underneath side of the decoy body, away from the surface normal thereof, and is provided with a weight at the tube end. In a preferred form of the invention, the weight serves three purposes: to lower the center of gravity of the decoy so as to preclude its tipping over when placed in water; to insure, by virtue of the weight's configuration, that the air tube will be permanently open at the outer extremity thereof so as to facilitate easy inflation and deflation; and to bend the tube at some medial point, when the decoy is resting in water, so as to insure the continued presence of air within the decoy previously introduced therein. When the decoy is withdrawn from the water and is disposed in a predetermined position, the air will be allowed to escape and the decoy may be compressed as desired.

In one form of the invention, an elongate connector such as a wire, a piece of string, or a length of rubber attaches the decoy to an anchor rod, which rod at one end thereof is insertable into the mud of a lake shoal area. The remaining end of the rod is provided with a loop which is designed to engage a novel belt hook, the latter being worn by the hunter on his belt. When the decoy is suspended from the belt of the hunter, by means of the cooperation of the rod loop and belt hook, then the aforementioned weight will straighten the air tube of the decoy so as to release the air contained therewithin, if such air has not been released previously. Furthermore, the anchor rod loop may be adapted for finger engagement so that, with an anchor rod of sufficient length, the decoy may be withdrawn thereby from the water without the hunter getting his hands wet.

It should be noted, furthermore, that when several anchor-rod and decoy combinations are to be positioned, a line may be strung through the loops of successive ones of the rods initially so that the decoy combinations may be retrieved simultaneously, by the hunter remaining in his place and merely reeling in the line.

Virtually any number of decoys (up to forty) may be attached conveniently to the hunter's belt hook for easy transport. The decoys in being deflatable lend themselves to convenient storage.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
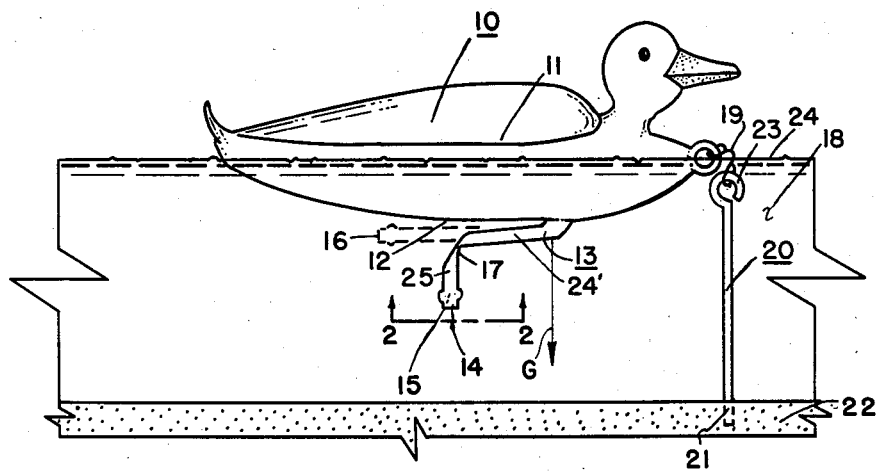
Figure 1 is a side elevation of a decoy, of the type described, resting in water, and with the anchor rod attached thereto inserted into a river or lake bottom near the shoal area thereof.

In Figure 1, decoy 10 comprises a duck or goose configured body 11 having an underneath side 12. Attached to underneath side 12 is a bendable air access tube 13 (approximately five inches in length, for example) which, under certain conditions, enables communication of air from without the decoy body to the interior thereof. Insertably positioned within extremity 14 of air access tube 13 is a ring configured weight 15. The force of gravity acting on the weight serves to remove the disposition of the outer half of air access tube 13 from the dotted line configuration 16 to that indicated in solid lines.

The inclusion of weight 15 within outer extremity 14 of air access tube 13 serves the following purposes: the center of gravity of the duck decoy is lowered so as to preclude its inadvertent tipping over due to water turbulence; weight 15 serves to produce a shut-off bend area 17 in the air access tube so as to prevent the escape of air from the duck interior therethrough and to prevent the admission of water into the decoy interior; and, as will be shown, the configuration of weight 15 may be such as to insure that extremity 14 of air access tube 13 is in a premanently open condition. Additionally, the decoy may be placed on a hard surface such as ice and, by virtue of the air shut-off tube disposed thereunder and bent by the weight thereof, will be caused to retain the air within the decoy interior, because of the valve action of the tube.

As can be seen in Figure 1 decoy 10 is resting in water area 18. Attached to decoy 10 by means of connector 19 is anchor rod 20. Flexible connector 19 may comprise a length of corrosion resistant wire or a length of rubber, for example.

Lower end portion 21 of anchor rod 20 is inserted into the shoal bottom 22. As its name implies, anchor rod 20 serves to anchor or emplace decoy 10 in a relatively fixed position; however, decoy 10 is permitted to drift annularly about anchor rod 20 by means of connector 19. The upper extremity of anchor rod 20 comprises a finger admittance loop 23, as shown. When emplaced, anchor rod 20 may be completely submerged into water area 18, or, if desired, loop 23 of anchor rod 20 may be positioned above water surface level 24 so as to facilitate the selective withdrawal of anchor rod 20 from the shoal area.

Figure 2:
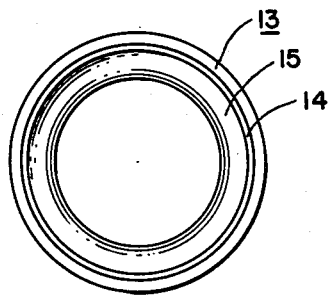
Figure 2 is a view taken along the line 2—2 in Figure 1.
Figure 3:
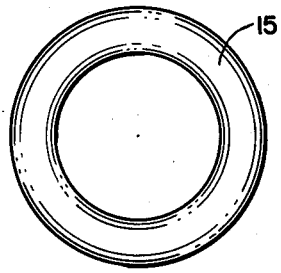
Figure 3 is an elevation of a representative weight which may be employed in the air tube of the decoy shown in Figure 1.

Figures 2 and 3 illustrate the configuration of a suitable type of weight 15, inserted within the extremity of air access tube 13 in Figure 1. Preferably, in order that the end of the air access tube will always be in open condition, weight 15 may simply be composed of metal such as lead, and ring configured. The cross section of the ring may be round, as shown, or of any desired configuration. In any event the insertion of ring configured weight 15 will insure that outer extremity 14 of air access tube 13 will be open permanently. If air access tube 13 is composed of rubber, then it may be desirous for the outer diameter of ring configured weight 15 to be slightly greater than the inner diameter of the air access tube when in an unstretched condition.

Referring again briefly to Figure 1, it will be noted that the upper portion 24' (i.e. between bend area 17 and tube-body juncture) of air access tube 13 is relatively stiff and permanently angulated relative to the force of gravity G acting thereon when the decoy is in an upright position; further, lower portion 25 of the air tube is designed to be relatively flexible. Hence, the bend area 17 in tube 13 is easily produced by virtue of the weight means disposed therein.

Figure 4:
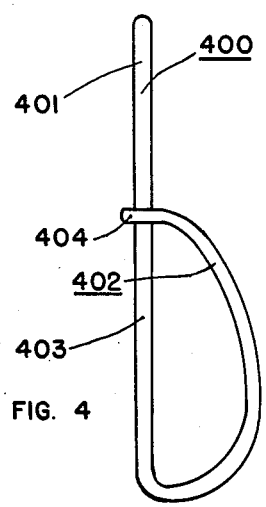
Figures 4 and 5 are front and side elevations of a decoy transport device which may be employed in the present invention.
Figure 5:
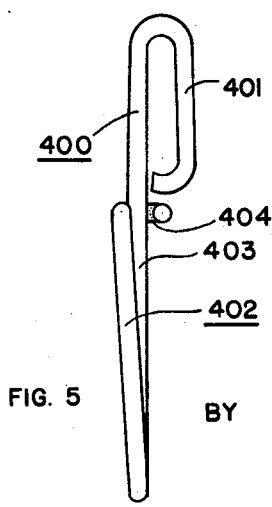

The decoy transport device of Figures 4 and 5 will be designated by the numeral 400 and includes a belt loop 401 and an anchor rod retaining hook 402. Retaining hook 402 includes stem portion 403 and also a catch 404 at the extremity thereof.

As is seen, decoy transport device 400 is positioned on the belt, shoulder strap or other support member of the wearer and hook 402 may be easily disengaged from stem 403 to receive one or a plurality of anchor rod loops 23 of respective anchor rods 20.

Figure 6:
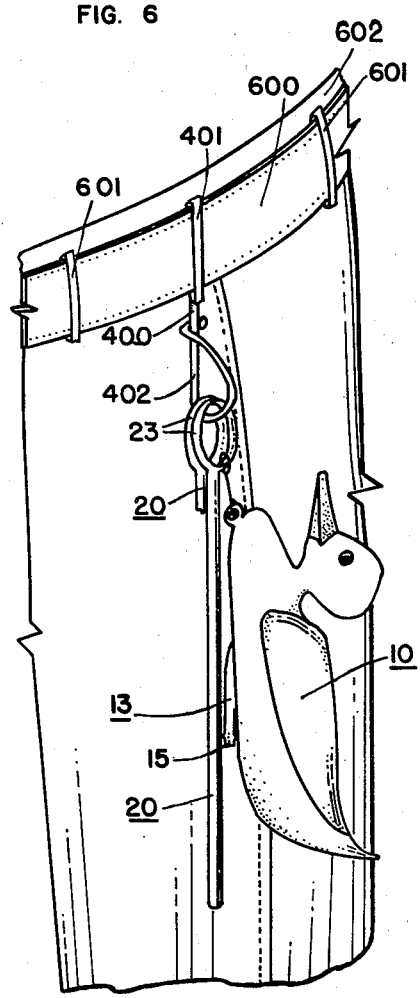
Figure 6 is a fragmentary, elevational view illustrating the manner in which the decoy apparatus of the present invention may be suspended from the hunter's belt for easy transport of the decoys.

This fact is illustrated in Figure 6. In Figure 6, belt 600 passes through trouser belt loops 601 of trousers 602 and also through belt loop 401 of decoy transport device 400. Anchor rod retaining hook 402 of decoy transport device 400 is thus shown in Figure 6 to be capable of accommodating the transport of a plurality of anchor rods 20, at loop area 23, for transport of a plurality of decoys 10. It will be noted in Figure 6 that, by virtue of weight 15 and the general disposition of air access tube 13 relative to the decoy body that air is automatically allowed to escape from the decoy interior upon attaching the decoy apparatus to the hook of the decoy transport device carried on the wearer's belt. The decoy is, hence, self-deflating. Further deflation, than that shown in Figure 6, may be accomplished by the hunter simply compressing further the decoy by hand pressure.

Again, and with reference to Figure 6, of great importance in the present invention is the fact that, by virtue of the open configuration of weight 15 and its inclusion within the extremity of air access tube 13, the decoys are, to a high degree, self-deflating.

It should be mentioned that the decoy transport device 400 of the present invention is ideally suited to accommodate the storage of a great number of decoys depending therefrom in compressed condition, for the loop 401 of the device may simply be placed over a hook, nail or other support member suitably disposed in a storage room. It is to be noted that whether in storage or in transport, the decoys with their associated connectors 19 and rods 20 will not be tangled; further, the individual rolling of the decoys for storage, which rolling might otherwise tend to spoil their shape and shorten their useful life, is not necessitated.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A collapsible, water-fowl decoy including a body having a hollow interior and an underneath side; a bendable air access tube affixed to said underneath side of said body and having a relatively stiff upper portion attaching to said body in angulated relationship relative to the gravitational force thereon when said decoy is resting in water, said tube also having a permanently open, outer extremity providing said hollow interior communication with external air when said decoy is not resting in water; and weight means affixed to said air access tube in proximity with said extremity thereof for producing an air and water shut-off bend in said tube when said decoy is resting in water in an upright position and for lowering the center of gravity of said decoy.

2. A collapsible, water-fowl decoy including a body having a hollow interior and an underneath side; a bendable air access tube affixed to said underneath side of said body and having a relatively stiff upper portion attaching to said body in angulated relationship relative to the gravitational force thereon when said decoy is resting in water, said tube also having a permanently open, outer extremity providing said hollow interior communication with external air when said decoy is not resting in water; and a ring configured weight fixedly disposed within said air access tube in proximity with said extremity thereof for producing an air and water shut-off bend in said tube when said decoy is resting in water in an upright position and for lowering the center of gravity of said decoy.

3. A collapsible, rubber, water-fowl decoy including a body having a hollow interior and an underneath side; a bendable air access, rubber tube affixed to said underneath side of said body and having a relatively stiff upper portion attaching to said body in angulated relationship relative to the gravitational force thereon when said decoy is resting in water, said tube also having a permanently open, outer extremity providing said hollow interior communication with external air when said decoy is not resting in water; and a ring-configurated weight of slightly greater outside diameter than the normal inside diameter of said tube, when said tube is radially unstretched, inserted within said outer extremity of said tube for producing an air and water shut-off bend in said tube when said decoy is resting in water in an upright position and for lowering the center of gravity of said decoy.

4. A collapsible, water-fowl decoy including a body having a hollow interior and an underneath side; a bendable air access tube affixed to said underneath side of said body and having a permanently open, outer extremity generally providing said hollow interior communication with external air when said decoy is not resting in water in an upright position; and weight means affixed to said air access tube in proximity with said extremity thereof for producing an air and water shut-off bend in said tube when said decoy is resting in water in an upright position, that portion of said tube between said shut-off bend and the tube-body juncture being permanently angulated away from the direction of the force of gravity when said decoy is resting in water in an upright position.

5. A collapsible, water-fowl decoy including a body having a hollow interior and an underneath side; a bendable air access tube affixed to said underneath side of said body and having a permanently open, outer extremity generally providing said hollow interior communication with external air when said decoy is not resting in water in an upright position and ring configured weight means inserted within said tube extremity for insuring said communication and for producing an air and water shut-off bend in said tube when said decoy is resting in water in an upright position, that portion of said tube between said shut-off bend and the tube-body juncture being permanently angulated away from the direction of the force of gravity when said decoy is resting in water in an upright position.

References Cited in the file of this patent

UNITED STATES PATENTS

| | | |
|---|---|---|
| 395,612 | Curlin | Jan. 1, 1889 |
| 747,732 | Kremer | Dec. 22, 1903 |
| 2,222,096 | Walthour | Nov. 19, 1940 |
| 2,245,267 | Elfstrand | June 10, 1941 |
| 2,252,795 | Weems et al. | Aug. 19, 1941 |
| 2,292,709 | McCann | Aug. 11, 1942 |
| 2,320,067 | Caughren | May 25, 1943 |
| 2,339,983 | Day | Jan. 25, 1944 |
| 2,341,028 | Fay | Feb. 8, 1944 |
| 2,434,335 | Signalness | Jan. 13, 1948 |
| 2,439,167 | Jackson | Apr. 6, 1948 |
| 2,589,913 | Wenner | Mar. 18, 1952 |
| 2,792,669 | Jackson et al. | May 21, 1957 |